United States Patent [19]
DiGiovanni et al.

[11] Patent Number: 5,802,236
[45] Date of Patent: Sep. 1, 1998

[54] ARTICLE COMPRISING A MICRO-STRUCTURED OPTICAL FIBER, AND METHOD OF MAKING SUCH FIBER

[75] Inventors: David John DiGiovanni, Montclair; Ashish Madhukar Vengsarkar, Berkeley Heights, both of N.J.; Jefferson Lynn Wagener, Charlottesville, Va.; Robert Scott Windeler, Bridgewater, N.J.

[73] Assignee: Lucent Technologies Inc., Murray Hill, N.J.

[21] Appl. No.: 799,311

[22] Filed: Feb. 14, 1997

Related U.S. Application Data

[60] Provisional application No. 60/018,716 May 31, 1996.
[51] Int. Cl.$^6$ .................................................. G02B 6/22
[52] U.S. Cl. ............................ 385/127; 65/428; 385/125
[58] Field of Search ................................ 385/123–127; 65/385, 428, 435

[56] References Cited

U.S. PATENT DOCUMENTS

| | | | |
|---|---|---|---|
| 3,622,291 | 11/1971 | Fleck et al. ...................... | 65/4 X |
| 3,902,879 | 9/1975 | Siegmund ......................... | 65/3 |
| 3,920,312 | 11/1975 | Siegmund ......................... | 385/125 |
| 4,070,091 | 1/1978 | Taylor et al. .................... | 350/96 WG |
| 5,113,470 | 5/1992 | Fukushima et al. ................ | 385/126 |
| 5,155,792 | 10/1992 | Vali et al. ....................... | 385/125 |
| 5,307,436 | 4/1994 | Berkey ............................ | 385/123 |
| 5,471,553 | 11/1995 | Teshima .......................... | 385/125 |
| 5,570,448 | 10/1996 | Imoto et al. ..................... | 385/124 |
| 5,647,040 | 7/1997 | Modavis et al. .................. | 385/123 X |
| 5,659,010 | 8/1997 | Sotoyama et al. ................. | 385/124 X |

FOREIGN PATENT DOCUMENTS

| | | |
|---|---|---|
| 59-092940 | 5/1984 | Japan . |
| 59-171903 | 9/1984 | Japan . |

OTHER PUBLICATIONS

"Full 2–D Photonic Bandgaps in Silica/Air Structures", by T. A. Birks et al., *Electronics Letters*, vol. 31, No. 22, 26th Oct. 1995, pp. 1941–1943.

"Pure Silica Single–Mode Fibre With Hexagonal Photonic Crystal Cladding", by J. C. Knight et al., *Proceedings of OFC (Optical Fiber Communication)*, PD 3–1 (Feb. 1996), pp. PD3–1–PD3–5.

"Photonic Crystals", by J. D. Joannopoulos et al., Princeton University Press, 1995, pp. 127–129. [No Month].

"Fused Silica Fibers With Metal Cores", by W. H. Grodkiewicz, *Mat. Res. Bull.*, vol. 10, Oct. 1975, pp. 1085–1090.

(List continued on next page.)

*Primary Examiner*—John D. Lee
*Attorney, Agent, or Firm*—Eugen E. Pacher

[57] ABSTRACT

Disclosed are non-periodic microstructured optical fibers that guide radiation by index guiding. By appropriate choice of core region and cladding region, the effective refractive index difference Δ between core region and cladding can be made large, typically greater than 5% or even 10 or 20%. Such high Δ results in small mode field diameter of the fundamental guided mode (typically<2.5 μm), and consequently in high radiation intensity in the core region. Exemplarily, a fiber according to the invention has a solid silica core region that is surrounded by an inner cladding region and an outer cladding region. The cladding regions have capillary voids extending in the axial fiber direction, with the voids in the outer cladding region having a larger diameter than those in the inner cladding region, such that the effective refractive index of the outer cladding region is greater than that of the inner cladding region. Non-periodic microstructured fiber potentially has many uses, e.g., as dispersion compensating fiber (with or without dispersion slope compensation), as amplifying fiber, as laser, as saturable absorber, for fiber gratings, and for non-linear elements. A method of making microstructured fiber is also disclosed.

20 Claims, 2 Drawing Sheets

OTHER PUBLICATIONS

"Photonic Band Structures", by J. B. Pendry, *Journal of Modern Optics*, vol. 41, No. 2, 1994, pp. 209–229. [No Month].

"Defect Modes in Photonic Band Structures: A Green's Function Approach Using Vector Wannier Functions", by K. M. Leung, *J. Opt. Soc. Am. B*, vol. 10, No. 2/Feb. 1993, pp. 303–306.

"All–Silica Single–Mode Optical Fiber With Photonic Crystal Cladding", by J. C. Knight et al., *Optics Letters*, vol. 21, No. 19, Oct. 1, 1996, pp. 1547–1549.

ARTICLE COMPRISING A MICROSTRUCTURED OPTICAL FIBER, AND METHOD OF MAKING SUCH FIBER

CROSS REFERENCE TO RELATED APPLICATION

This application claims priority of provisional application Ser. No. 60/018,716, filed May 31, 1996.

FIELD OF THE INVENTION

This invention pertains to "microstructured" optical fiber, to articles and systems (collectively "articles") that comprise such fiber, and to methods of making such fiber.

BACKGROUND OF THE INVENTION

Optical fiber communication systems typically comprise a variety of fibers and fiber-based components, e.g., low loss transmission fiber, Er-doped amplifier fiber, dispersion compensating fiber, and fiber with in-line refractive index gratings. All of these achieve guiding by means of total internal reflection, based on the presence of a solid core of relatively high refractive index that is surrounded by a solid cladding that has relatively low refractive index.

Recently a new type of optical fiber has been proposed. See T. A. Birks et al., *Electronic Letters*, Vol. 31 (22), p. 1941 (October 1995), and J. C. Knight et al., *Proceedings of OFC*, PD 3-1 (February, 1996), both incorporated herein by reference. The new optical fiber, referred-to as a "photonic crystal" or "photonic bandgap" (PBG) fiber, involves a dielectric structure with a refractive index that varies periodically in space (in the x-y plane; it is independent of the z-coordinate, i.e., the longitudinal coordinate of the structure), with a period of the order of an optical wavelength (e.g., about 1–2μm). According to the authors of the above cited references, in such a structure Bragg diffraction can take place, such that the structure exhibits a photonic stop band for certain values of wavelength and propagation direction. In consequence of the Bragg diffraction, radiation of certain wavelengths can only propagate in the longitudinal direction, with essentially no lateral leakage. The structure thus is a guiding structure that achieves guiding by a mechanism that differs fundamentally from the index guiding of conventional optical fibers. PBG fiber is an example of a "microstructured" fiber, as the term is used herein.

The above-cited Birks et al. reference states that applications of PBG fibers "... arise from the unique properties of the fibers", and discloses that a polished PBG fiber could provide a sensitive water pollution-or bio-sensor, or a novel gas sensor, and that other applications could follow from the polarization properties of the structure.

The Birks et al. reference also discloses that work is under way to make PBG fiber "... by a multiple stack-and-draw process." The Knight et al. reference discloses that PBG fiber is formed "... by creating a hexagonal silica/air preform (including a deliberate defect to guide light) on a macroscopic scale and then reducing its size by several orders of magnitude by pulling it into an optical fibre." "The unit cell of the photonic crystal is formed by drilling a hole down the centre of a silica rod and milling six flats on the outside, to give a hexagonal cross-section." A central "defect" is introduced by substituting a solid hexagonal rod for a rod with a longitudinal bore. Multiple drawings of the compound structure resulted in a PBG fiber of hexagonal cross section, with 34 μm flat-to-flat diameter, and 2.1 μm pitch between air holes.

The prior art process of making PBG fiber is difficult and costly, and it clearly would be desirable to have available a simpler, less costly method for making microstructured fiber. This application discloses such a method. Furthermore, this application discloses a novel fiber (to be referred to as "non-periodic microstructured" fiber) that can be made by the novel method, as well as optical fiber communication systems and other articles that comprise microstructured fiber.

Glossary and Definitions

In this application we distinguish between "refractive index" and "effective refractive index". The refractive index of a feature that consists of a given material (not excluding a void) is the conventional refractive index of the material. On the other hand, the "effective refractive index" of a feature of a fiber (e.g., of the cladding region) is the value of refractive index of the feature that gives, in a simulation of the fiber, the same optical properties as the actual fiber. If the feature is substantially homogeneous (e.g., the core region), then the effective refractive index of the feature will be substantially the same as the refractive index of the feature. If, however, the feature is non-homogeneous (e.g, a cladding region that comprises voids disposed in a matrix), then the effective refractive index of the feature will differ from both the refractive index of the voids and the refractive index of the matrix material. Roughly speaking, the effective refractive index of a non-homogeneous material can be considered to be a weighted average of the refractive indices of the constituents of the material. It is known that the effective refractive index N of a 2-component material meets the following condition:

$$(n_1 n_2)(\sqrt{f_1 n_2^2 + f_2 n_1^2})^{-1} \leq N \leq \sqrt{f_1 n_1^2 + f_2 n_2^2},$$

where $n_1$ and $n_2$ are the refractive indices of the two components, and $f_1$ and $f_2$ are the respective volume fractions. For a material consisting of 50% b.v. air and 50% b.v. silica, this gives $1.164 < N < 1.245$. Exact values of effective refractive indices can be obtained by numerical simulation of the guiding properties of microstructured optical fibers, exemplarily using vector solutions of Maxwell's equations. Such calculations are known to those skilled in the art. See, for instance, "Photonic Crystals", J. D. Joannopoulos et al., Princeton University Press, 1995. Our simulation of the above referred to 50/50 air/silica material, as described in Example 2, gave N~1.20.

The term "effective diameter" of a fiber region herein has its conventional meaning. For instance, for a fiber having a given core effective refractive index $N_o$ and a given cladding effective index $N_c$, the effective core diameter at a given wavelength λ is that core diameter of a step index profile that yields the same V-number as the actual fiber.

Cladding features are "non-periodically" disposed in the first cladding material if at least one of the cladding features is not at a position of a periodic array, or differs in some property (e.og., diameter) from the other cladding features.

The "A" of a microstructured fiber is $(N_o - N_c)/N_c$, where $N_o$ and $N_c$ are defined above.

SUMMARY OF THE INVENTION

We have discovered that microstructured optical fibers do not have to have the fully periodic "cladding" microstructure disclosed in the prior art. Indeed, we have so far been unable to verify the existence of a photonic bandgap in microstructured optical fiber. However, we have found that microstructured fibers can serve as optical waveguides, and can have properties that are unattainable in conventional optical fibers, provided that the fiber meets some simple conditions. Among these properties is an effective refractive index difference between core and cladding that can be much larger than the refractive index difference obtainable by means of doping. Such microstructured fibers can be advantageously used in optical fiber communication systems, e.g., as dispersion compensating fiber, as photosensitive fibers and as rare earth-doped fibers.

The invention is embodied in an article (e.g., an optical fiber communication system) that comprises a microstructured optical fiber that comprises a (typically solid) core region surrounded by a cladding region that comprises a multiplicity of spaced apart cladding features that are elongate in the fiber axial direction and disposed in a first cladding material, the core region having an effective diameter $d_o$ and an effective refractive index $N_o$, the cladding features having a refractive index that differs from the refractive index of the first cladding material, and the cladding region having an effective refractive index that is less than $N_o$.

Significantly, the cladding features are non-periodically disposed in the first cladding material.

Microstructured fibers according to the invention can be single mode fibers or multimode (typically only a few modes) fibers. The core region typically will be solid material, either homogeneous or a combination of materials (e.g., an inner Si core region and an outer $SiO_2$ core region), but could comprise a liquid. For instance, the core region could comprise a glass capillary tube, with the liquid drawn into the capillary after fiber drawing.

In exemplary currently preferred embodiments the core region is silica (doped or undoped), the first cladding material is silica, and the cladding features are voids. However, the core region need not have the same composition as the first cladding material, and/or the cladding features need not be voids. For instance, the core could comprise a silicon inner core (to impart to the core a higher effective refractive index), or the cladding features could be a polymer with predetermined refractive index, liquid crystal material or F-doped silica.

As those skilled in the art will recognize, elimination of the prior art requirement of strict periodicity of the cladding features can make it easier to manufacture microstructured fibers (and makes possible novel techniques for making such fibers). The elimination of the requirement is based on our realization that Bragg diffraction is not a requirement for radiation guiding in microstructured fiber, and that such fibers can be effective index guides.

By way of example, a currently preferred microstructured fiber according to the invention has an inner cladding region and an outer cladding region, with the cladding features in the inner cladding region being voids of larger diameter than the void cladding features of the outer cladding region. The inner cladding region thus has effective refractive index $N_{ci}$ less than the effective refractive index $N_{co}$ of the outer cladding region. A homogeneous silica outer cladding is typically provided for strength reasons. Such fiber can exhibit large dispersion (e.g., dispersion that is more negative than −300 ps/nm·km) at a predetermined wavelength $\lambda$ (e.g., 1.55 μm) and for a fundamental guided mode, and thus can be used advantageously for dispersion compensation. Furthermore, the fiber can have large dispersion slope, such that the fiber can provide dispersion compensation over a significant wavelength range-, e.g., 20 nm or more. Such fiber also can have a small mode field diameter, e.g., less than 2.5 μm at $\lambda$ and for the fundamental mode. Fiber according to the invention that comprises a photosensitive material in the core region can advantageously be used for optical fiber gratings, and fiber that comprises one or more rare earths (e.g., Er) in the core region can advantageously be used for fiber amplifiers and/or lasers. All of these applications benefit from the large $\Delta$ that can be attained in microstructured fibers according to the invention.

The invention is also embodied in a method of making microstructured optical fibers. The method comprises providing a core element (e.g., a silica rod) and a multiplicity of capillary tubes (e.g., silica tubes). The capillary tubes are arranged as a bundle, with the core element typically in the center of the bundle. The bundle is held together by one or more overclad tubes that are collapsed onto the bundle. The fiber is then drawn from the thus prepared preform.

Significantly, one end of the capillary tubes is sealed, either before or after assembling the bundle, and the fiber is drawn from the other end of the bundle (preform). The resulting internal pressure in the capillary voids serves to maintain the capillary voids open. On the other hand, the voids between the capillary tubes remain open, and thus readily collapse during drawing.

The above described method can be practiced with periodic or nonperiodic cladding features. In the latter case, the cladding features can vary in size or be arranged irregularly, provided only that the effective refractive index profile of the resulting fiber is such that the fiber supports the desired guided mode or modes.

DETAILED DESCRIPTION OF SOME PREFERRED EMBODIMENTS

Figure 1:
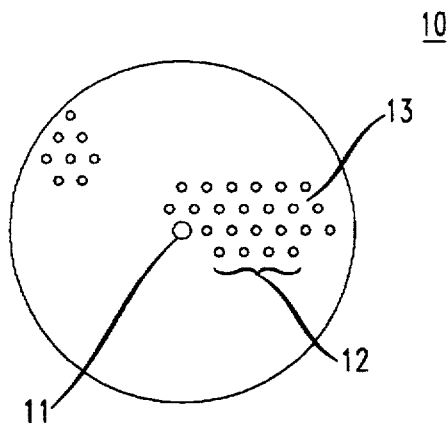
FIGS. 1 and 2 are schematic depictions of microstructured fibers in cross section.

As those skilled in the art will recognize, the microstructured fibers of interest herein have finite size (e.g., about 125 μm diameter) in the x-y plane, i.e., the plane normal to the longitudinal (z) coordinate of the fiber, and typically have substantially infinite extent (e.g., meters or even kilometers) in the longitudinal direction.

PBG fibers as proposed by Birks et al. have a central structural feature (referred to as the "defect"; it should be emphasized that this terminology is used to indicate the presence of an element that differs in some way from the elements in an otherwise uniform array. It does not imply a fault or unintended feature) that is surrounded by a periodic array of cladding features. Herein we will refer to the defect as the "core region". The core region need not be at the center of the fiber structure, although in practice it will generally be centrally disposed. The core region in PBG fiber breaks the symmetry of the structure. It can differ from the cladding features in any of a wide variety of ways, e.g., with regard to size, or with regard to refractive index. The latter can vary widely, from 1 (air) through 1.45 (silica) to much larger values associated with different glasses or even non-glass materials such as semiconductors. Indeed, in principle the only limitation on the choice of core region is compatibility with the process of making the fiber.

The cladding features of PBG fiber similarly can consist of a void, or any suitable (second) material disposed in a (first material) matrix. The features are disposed to form a periodic array, with one of the sites of the array occupied by the above-described core region. By way of example, the array is formed by a multiplicity of elongate voids of a given diameter that are arranged in a triangularly symmetric pattern, as shown schematically in FIG. 1, wherein numerals 10–13 refer, respectively, to an exemplary PBG fiber in cross section, the core region, the cladding feature array, and an exemplary "unit cell" of the array.

The array does not necessarily have a unit cell of triangular symmetry. Among other possible arrays are those with square unit cell and those with hexagonal unit cell, the latter being schematically shown in FIG. 2, wherein numeral 23 refers to an exemplary hexagonal unit cell.

We have discovered that the stringent requirements that were postulated by the above cited references can be considerably relaxed. In particular, we have discovered that there is no need for periodicity in the x-y plane (cross section) of the fiber. Instead, it is necessary that the fiber possesses a core region having an effective index of refraction that is significantly higher than the effective index of refraction of a cladding region that surrounds the core region and comprises a multiplicity of microstructural cladding features, e.g., capillary voids, with the cladding features not necessarily forming a periodic array. Indeed, the cladding features can even be randomly distributed and vary in size or other relevant property, provided that the fiber has a suitable effective refractive index profile. This of course constitutes a profound departure from the prior art PBG fibers.

Figure 5:
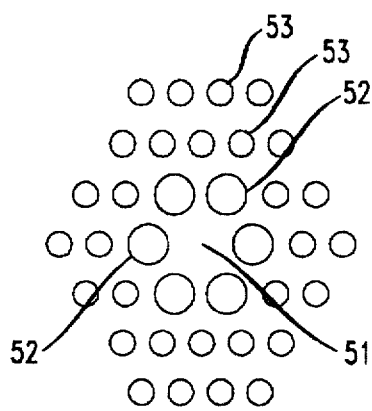
FIG. 5 shows a portion of the cross section of an exemplary non-periodic microstructured fiber.

FIG. 5 schematically shows a relevant portion of a non-periodic microstructured optical fiber. The structure comprises a solid core region 51 surrounded by an inner cladding region comprising first cladding features 52, arranged in basically hexagonal form, with the inner cladding region surrounded by an outer cladding region comprising second cladding features 53, not all of which are shown.

Exemplarily, the cladding features are voids, with the remainder of the structure being glass, e.g., silica. In a particular embodiment, the first and second cladding features have diameter 0.833 μm and 0.688 μm, respectively, with the center-to-center spacing of the cladding features being 0.925 μm. The first cladding features are positioned such that the inscribed circle of core region 51 is 1.017 μm.

As will be recognized by those skilled in the art, the core region, consisting of glass, will have an effective refractive index substantially equal to the refractive index of the glass. The inner cladding region has a larger ratio of void to glass than the outer cladding region. Consequently, the inner cladding region has a lower effective refractive index than the outer cladding region, and both cladding regions have lower effective refractive index than the core region.

Figure 6:
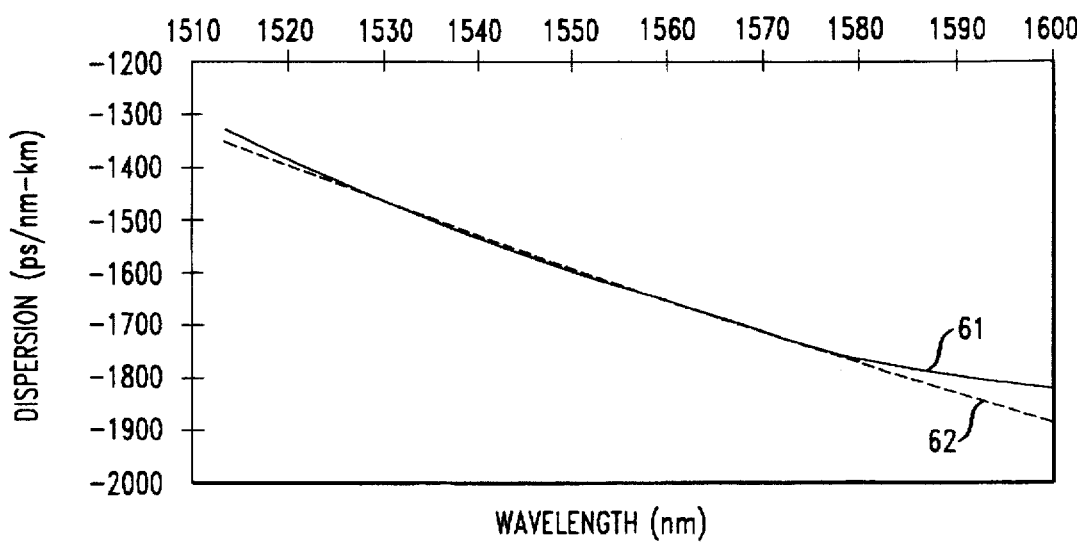
FIG. 6 shows the dispersion spectrum of a length of the fiber of FIG. 5.

FIG. 6 shows the computed dispersion spectrum 61 of the above described exemplary microstructured fiber, with the glass being silica, and the capillary features being air. Dashed curve 62 is the negative dispersion spectrum of 94 km of commercially available 5D® fiber. As can be seen from FIG. 6, 1 km of the fiber according to the invention essentially perfectly compensates the dispersion of 94 km of a conventional single mode transmission fiber over a spectral range of more than 20 nm, namely, about 50 nm.

As disclosed above, FIG. 5 does not show all of the second cladding features of the fiber. Our simulations indicate that at least 4 "layers" of second capillary features should be provided. Typically, the microstructured cladding region will, for mechanical reasons, be surrounded by solid glass cladding that is far enough away from the core region such that it is essentially optically inactive.

The above discussed non-periodic microstructured fiber is an example of a fiber that has large negative dispersion and a negative dispersion slope. Such fiber can be advantageously used as dispersion compensating fiber. As described, the non-periodicity is due to the presence of both first and second cladding features. However, the second cladding features could also be non-periodically disposed.

In general, the microstructure cladding features should be disposed such that the cladding region does not contain any matrix regions of extent in the x-y plane sufficient to act as a secondary core, i.e., to support a propagating radiation mode. Frequently this condition is met if the microstructured cladding does not contain any microstructure-free region (in the x-y plane) that is larger in area than the core region. More generally, the microstructure cladding features should be distributed (in the x-y plane) such that there is no cladding area with (x-y plane) dimensions equal to or larger than the core region that has effective refractive index larger than $(N_o+N_c)/2$, where $N_c$ is the effective refractive index of the relevant cladding region.

We will next discuss a particular, and currently preferred, embodiment of a method of making a microstructured fiber. The method can be used, with suitable minor modifications, to make a non-periodic microstructured fiber as described above.

Silica capillary tubes (exemplarily 0.718 mm outside diameter, 0.508 mm inside diameter, 12 inches length) are sealed on one end, and bundled into a close-packed arrangement. The center capillary tube is replaced by a silica tube of different (exemplarily smaller) inside diameter, or by a silica rod of the same outside diameter. A silica tube is placed over the bundle of, exemplarily 169, silica capillary tubes, and collapsed onto the bundle so as to preserve the close-packed arrangement. The resulting preform is fed into the hot region of a conventional draw furnace such that the un-sealed ends of the capillary tubes are heated. When an appropriate temperature (exemplarily 2000° C.) is reached, fiber is drawn from the hot end of the preform. Exemplary preform feed rates are in the range 0.4–3.5 mm/minute, and exemplary draw speeds are in the range 0.2–0.5 m/s. Drawing typically is carried out in an inert atmosphere, e.g., argon.

Initially, the unsealed ends of the silica capillary tubes typically close due to surface tension, thereby sealing in a volume of air in each "tube". As fiber is drawn from the preform, the volume available to the air decreases, with attendant increase in pressure. This continues until the pressure overcomes the surface tension and capillary force, causing the sealed tubes to open. The pressure in the sealed tubes generally is self-regulating, such that the cross sectional area of the silica to the area of the holes in the silica is constant, as the fiber is drawn to any desired diameter. The fiber can be coated in conventional fashion. Sealing of one end of the capillary tubes could be carried out before or after bundling.

Whereas the sealed tubes remain open because of the sealed-in air, the interstitial spaces between the tubes are eliminated because the spaces remain open to the atmosphere, and pressure therefore does not build to compensate for the surface tension. The resulting structure is substantially as shown in FIG. 1., with a core region and a regular array of capillary voids in a silica body. Note that a microstructure array is also created when the interstitial spaces are not required to close. Such a structure can also exhibit light-guiding properties.

The center-to-center spacing (pitch) of the voids are inter alia a function of the outside diameter of the capillary tubes and of the draw ratio, and the air-to-glass ratio is inter alia a function of capillary tube wall thickness. The fiber diameter can be independently increased by conventional overcladding of the preform, and overcladding will frequently be desirable to increase fiber strength, and to facilitate cleaving, splicing, and other operations that are standardized with respect to fiber diameter.

Those skilled in the art will recognize that the above-described method can readily be adapted to form arrays of different symmetry. For instance, by appropriate substitution of silica rods (or capillary tubes of different inside diameter) for silica capillary tubes, the method can be used to produce microstructured fiber with hexagonal array unit cell, of the type shown in FIG. 2.

Alternatively, the method can be modified to yield microstructured fiber with solid cladding features instead of voids. The desired second material (e.g., F-doped silica) is deposited on the inner surfaces of the first material (e.g., silica) tubes to a thickness that determines the feature diameter, and fiber is drawn from the preform substantially as described, except that the ends of the tubes are not sealed, thereby facilitating collapse of the tubes. Alternatively, the voids may be filled with metal or a glass with lower melting temperature than the capillary tube material. This may be accomplished by allowing the metal or second glass to melt when exposed to heat from the draw furnace and to flow into the voids, possibly under vacuum, while the capillary glass remains rigid enough to be substantially undeformed. Suitable metals include Al, Pb, Au, Ag and Cu, among others, as described by W. H. Grodkiewicz et. al. in *Mat. Res. Bull.*, Vol. 10 (10), p. 1085 (1975), incorporated herein by reference. A suitable second glass should preferably have relatively low viscosity (is "molten") at the appropriate working temperature, whereas the capillary material is relatively rigid at that temperature. The second-to-first material ratio (analogous to the above referred to air-to-glass ratio) is inter alia a function of the wall thickness of the first material tube.

Exemplarily, non-periodic microstructured fibers can also be produced from porous material (typically porous glass, exemplarily silica gel), provided the glass/air ratio of the material can be controlled. Known sol/gel processes of making porous silica bodies allow such control. Drawing fiber from a preform that comprises a porous glass cladding region can be expected to result in randomly distributed elongate voids.

The guiding properties of microstructured fibers depend, in general analogy to those of conventional index-guiding fiber, on fiber geometry and effective refractive index profile. As is the case for conventional fiber, computer simulations can be used to determine the specific structure that will provide a desired property or characteristic. Algorithms have been proposed and used to determine the optical properties of 2-dimensional and 3-dimensional photonic crystals. See, for instance, J. D. Joannopoulos et al., "Photonic Crystals", Princeton University Press, 1995, especially pp. 127-129; J. B. Pendry, *J. Modern Optics*, Vol. 41 (2), p. 209 (1994); K. M. Leung, *J. Optical Society of America*, Vol. 10 (2), p. 303 (1993).

Computer simulation generally involves solution of vector Maxwell's equations by finite element techniques, yielding the optical vector fields in a region of interest, and thus yielding complete information about optical propagation in the region. Thus, the fiber geometry, including array symmetry, index differences, second-to-first material ratio (or void/material ratio), and core properties can be designed to yield the desired properties of a microstructured fiber.

Conventional (index-guiding) optical fibers typically are designed to have at most of few percent refractive index difference $\Delta$ between core and cladding, primarily because, for $\Delta$ greater than about 2%, the loss of a single mode fiber increases significantly with increasing $\Delta$. On the other hand, in microstructured fiber the index difference can be much larger, typically at least 5%. Furthermore, microstructured fiber has parameters (e.g., symmetry, structure size, second-to first material volume ratios, core properties) that do not have a counterpart in conventional index-guided fiber, and which provide greater design freedom to the designer of microstructured fiber, making possible novel devices based on such fibers.

For instance, in consequence of the large range of index difference potentially available in microstructured fiber, such fiber can be tailored to have relatively large (in absolute value) waveguide dispersion. Microstructure fiber thus can advantageously be used as dispersion compensator in an optical fiber communication system, including for dispersion slope compensation.

Figure 3:
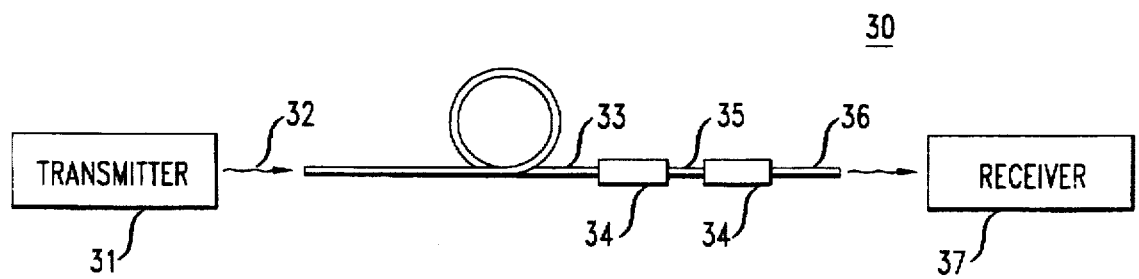
FIG. 3 schematically shows an optical fiber communication system comprising a microstructured fiber.

FIG. 3 schematically shows an exemplary optical fiber communication system 30 with numerals 31–37 referring to a transmitter, signal radiation of wavelength $\lambda$ (e.g., 1.3 or 1.55 μm), optical transmission fiber, optical couplers, a length of microstructured fiber, optional further transmission fiber, and receiver, respectively. Other conventional components (e.g., optical amplifiers, pump lasers, optical isolators, Bragg gratings, WDMs etc.) will typically be present but are not shown.

Index guiding dispersion compensating (DC) fibers are known, as is their use in optical fiber communication systems to compensate for the dispersion of a given length of transmission fiber. For instance, DC fiber can be used to facilitate 1.55 μm transmission over optical fiber that has minimum dispersion in the 1.3 μm communication wavelength range. The transmission fiber exemplarily has chromatic dispersion of about 17 ps/nm·km and prior art DC fiber exemplarily has chromatic dispersion of about −150 ps/nm·km. Thus it can readily be seen that a relatively long length (e.g., 13.6 km) of prior art DC fiber typically is required to compensate for the dispersion of a typical length (e.g., 120 km) of transmission fiber. On the other hand, microstructured fiber can be designed to have relatively large (positive or negative, as desired) chromatic dispersion, such that a relatively short length (e.g., 1.3 km) of microstructured DC fiber can compensate the dispersion of the transmission fiber.

A significant aspect of the design of the microstructured DC fiber is selection of the core, which can range from silica (refractive index about 1.45) to material (e.g., Si) having an index high compared to silica, yielding large effective index differences, exemplarily >10% and more. Details of the design can be determined by computer simulation in known manner, typically by solution of the vector Maxwell's equations.

More broadly, microstructured fiber not only can be readily designed as high $\Delta$ fiber, but can for instance also be designed to have, in addition to the high $\Delta$, a photosensitive core or a rare earth doped core.

A microstructured fiber with high Δ and photosensitive core is of considerable interest because such a fiber gives a small (e.g., 2.5 μm or less) mode diameter of the guided radiation, resulting in high optical intensity in the core, with attendant increased non-linearity in the fiber. This in turn makes it possible to provide a fiber Bragg saturable absorber, a device that can be advantageously used in, for instance, a mode-locked fiber laser. The high nonlinearity of high Δ microstructured fiber with photosensitive core also facilitates all-optical non-linear Kerr switching in fiber, using a Bragg or long period grating. Such fiber exemplarily has a Ge, B or Sn-doped core, and typically is subjected to a known $H_2$ and/or $D_2$ treatment before grating "writing", to increase the photosensitivity of the core.

A microstructured fiber with big Δ and rare earth doped core can be readily produced, for instance, by using a rare earth-doped (e.g., Er) core rod in a structure as shown in FIG. 5. Such fiber offers considerable advantages over conventional rare earth-doped fibers. Among these is lower required power, due principally to the high attainable optical intensity in the core. Current rare earthdoped fibers typically have Δ's larger than those of conventional transmission fibers, to decrease laser and amplifier threshold powers and increase efficiency. Using a rare earth-doped high Δ microstructured fiber instead of a conventional rare earth-doped fiber can result in dramatically reduced threshold power, making devices such as remotely pumped amplifiers more practical and less expensive. Thus, a remotely pumped optical fiber communication system that comprises rare earth-doped high Δ (e.g., >5%) non-periodic microstructured fiber is an exemplary and preferred article according to this invention. In such a system, the pump radiation source typically is more than 200 m (frequently many kilometers) from the fiber amplifier.

In some applications of optical fiber it is desirable to have available optical fiber having large non-linearity, as conventionally expressed by the values of the second and third order coefficients of the susceptibility, usually designated $\chi^{(2)}$ and $\chi^{(3)}$. Microstructured fiber can be readily designed to have large third-order nonlinearity. Since most of the guided optical power is in the core region, the amount and character of the fiber non-linearity is largely determined by the material and size of the core region. Exemplarily, if the core region has large non-linearity, then the fiber will exhibit large non-linearity and be useful for, e.g., parametric amplification. This can be accomplished by, e.g., providing a core region that consists of multicomponent glass having large non-linearity, e.g., Pb-doped silica.

However, as discussed above, high Δ microstructured fiber can exhibit large non-linearity even if the core region is undoped, or doped with a dopant that does not significantly increase the nonlinearity. This is due to the small mode field that is a consequence of the high Δ of the fiber.

The use of microstructured fiber in optical fiber communication systems is not limited to the above described exemplary uses, and undoubtedly other uses will be discovered as microstructured fibers become better known and understood.

Figure 2:
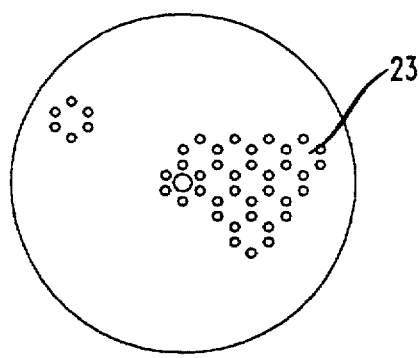
Figure 4:
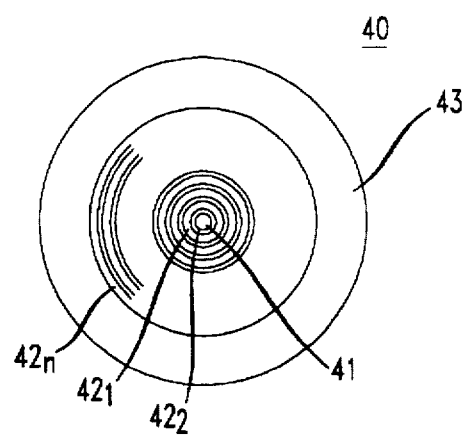
FIG. 4 shows a further embodiment of a microstructured fiber in schematic cross section.

Furthermore, microstructured fibers are not limited to fibers with an array of cladding features, of the type shown schematically in FIGS. 1, 2 or 5. FIG. 4 shows an alternative microstructured fiber 40 having circular symmetry, with the core feature 41 surrounded by a multilayer 421-42n (exemplarily more than 10 or even 20 layers) cladding, with alternating relatively high and low refractive indices. The refractive indices and layer thickness are selected such that the structure has a desired effective refractive index profile. For instance, the layer thicknesses can be chosen such that an inner cladding region has a relatively low effective refractive index, and an outer cladding region that surrounds the inner cladding region has an effective refractive index of value between that of the core region and the inner cladding region. Such a microstructured fiber can be made, for instance, by drawing from a preform, with the described multilayer cladding formed by, e.g., a conventional deposition technique such as MCVD, or by collapsing a multiplicity of glass tubes around the core feature. Optional outer cladding 43 can be conventional.

EXAMPLE 1

Microstructured fiber is made as follows. A multiplicity (exemplarily 169) of silica capillary tubes (outside diameter 0.718 mm, inside diameter 0.508 mm, length 12 inches) is provided, and arranged in a close-packed bundle. The center tube of the bundle is replaced by a solid silica rod of outside diameter 0.718 mm. One end (to be referred to as the "first" end; the other end will be referred to as the "second" end) of each capillary tube in the bundle is sealed, without sealing the interstitial spaces in the close packed bundle. Silica tubes, of inner diameter slightly larger than the diameter of the bundle, are slid over the first and second ends of the bundle, respectively, and the combination is mounted in a conventional glass-working lathe. The end of one of the tubes is collapsed, with the aid of a vacuum, onto the first end of the bundle. This is followed by collapse of the end of the other tube onto the second end of the bundle, and pulling off this tube such that the bundle remains in the desired arrangement.

After making a hole in conventional fashion through the remaining silica tube near the first end of the bundle, a thin (exemplarily 1 mm wall thickness) silica overcladding tube is slid over the assembly past the hole, and is collapsed onto the bundle at the first end, and then at the second end, such that a vacuum can be drawn through the hole. Subsequently, the torch of the lathe is traversed from the second to the first end such that the overcladding tube is collapsed around the bundle. The overcladding step optionally is repeated with a silica tube selected to yield the desired array pitch and fiber diameter. Exemplarily, a standard (19×25 mm diameter) silica tube is used.

The thus produced preform is removed from the lathe and is mounted, second end down, on a draw tower, and fiber is drawn from the preform in conventional fashion. The resulting fiber has 125 μm outside diameter, 1:1 glass-to-air ratio, 2 μm array pitch, with the cladding voids forming seven concentric layers around the central defect, with triangular unit cell. The fiber is coated in conventional fashion, and has optical properties substantially as predicted by a computer simulation.

EXAMPLE 2

Non-periodic microstructured fiber is made substantially as described in Example 1, except that the core feature is a silica rod of diameter 0.718 mm, the rod is surrounded by six silica tubes of inner diameter 0.615 mm and outer diameter 0.718 mm, which in turn are surrounded by more than four layers of silica tubes of inner diameter 0.508 mm and outer diameter 0.718 mm, substantially as shown in FIG. 5. This preform is overclad with silica tubes selected to yield, after drawing a desired fiber diameter. Specifically, preform diameter is 97 mm. This preform is drawn into fiber having 125 μm diameter, having a microstructured region as shown in FIG. 5, with 1.017 μm diameter core region (as represented by the diameter of the inscribed circle), center-to-center spacings 0.925 μm, and voids of 0.833 μm and 0.688 μm. The fiber has a dispersion spectrum substantially as shown in FIG. 6.

The invention claimed is:

1. An article comprising a microstructured optical fiber having an axial direction and a cross section perpendicular to said axial direction, the optical fiber comprising a core region surrounded by a cladding region that comprises a multiplicity of spaced apart cladding features that are elongate in the axial direction and disposed in a first cladding material, the core region having an effective refractive index $N_o$, the cladding features having a refractive index that differs from a refractive index of the first cladding material, and the cladding region having an effective refractive index that is less than $N_o$;

CHARACTERIZED IN THAT the cladding region comprises an inner cladding region surrounding the core region and an outer cladding region surrounding the inner cladding region, said inner and outer cladding regions having effective refractive indices $N_{ci}$ and $N_{co}$, respectively, with $N_{ci}<N_{co}$; the cladding features in the inner cladding region having a larger size in cross section than the cladding features in the outer cladding region.

2. Article according to claim 1, wherein said cladding features are non-periodically disposed in the cross section.

3. Article according to claim 1, wherein at least one of said cladding features differs from the remaining cladding features with respect to the refractive index.

4. Article according to claim 1, wherein the core region and the first cladding material are silica, and the cladding features are voids.

5. Article according to claim 1, wherein the core region comprises a rare earth element; or the core region comprises a photosensitive material; or the core region comprises a material selected to provide the fiber with high third-order non-linearity.

6. Article according to claim 5, further comprising reflectors that define an optical cavity in the microstructured optical fiber.

7. Article according to claim 1, wherein the microstructured optical fiber is a single mode optical fiber for radiation of a predetermined wavelength λ.

8. Article according to claim 1, wherein $N_o$ and the refractive indices of the cladding region are selected such that the microstructured optical fiber exhibits, at a predetermined wavelength λ and for a fundamental guided mode, a dispersion that is more negative than −300 ps/nm·km.

9. Article according to claim 1, wherein $N_o$ and the effective refractive indices of the cladding region are selected such that the microstructured optical fiber has a mode field diameter of a fundamental guided mode less than 2.5 μm at wavelength λ.

10. Article according to claim 1, wherein at least some of the cladding features are solid cladding features that comprise a material other than the first cladding material.

11. Article according to claim 1, wherein the microstructured optical fiber comprises a grating region wherein $N_o$ varies in predetermined manner in the axial direction.

12. Article according to claim 1, further comprising an optical signal transmitter, an optical signal receiver, and an optical fiber transmission path that signal transmissively connects said receiver and transmitter, wherein the transmission path comprises a first length of said microstructured optical fiber.

13. Article of claim 12, wherein a given length of the optical fiber transmission path has, at a wavelength λ, a dispersion D for a fundamental mode radiation, and said first length of the microstructured optical fiber has, at λ, dispersion substantially equal to −D for said fundamental mode radiation.

14. Article according to claim 13, wherein the given length of the optical fiber transmission path has, at wavelength λ, a dispersion slope D' for the fundamental mode radiation, and the length of the microstructured optical fiber has, at λ, a dispersion slope substantially equal to −D' for the fundamental mode radiation, such that the dispersion of the given length of the optical transmission path is substantially cancelled over at least a 20 nm wavelength region that comprises λ.

15. Article according to claim 12, further comprising an optical coupler for coupling a pump radiation into said first length of microstructured optical fiber, the core region of the microstructured optical fiber comprising a rare earth element, said pump radiation provided by a pump radiation source and selected to provide amplification of signal radiation from said transmitter.

16. Article according to claim 15, wherein said pump radiation source is more than about 200 m from said optical coupler.

17. Article according to claim 12, wherein the first length of the microstructured optical fiber comprises a grating region wherein $N_o$ varies in predetermined manner in the axial direction.

18. Method of making a microstructured optical fiber, the method comprising a) providing a core element and a multiplicity of capillary tubes, said capillary tubes and the core element arranged as a bundle, with the core element surrounded by the capillary tubes, and with interstitial spaces between the capillary tubes;

b) forming a preform by a process that comprises collapsing a cladding tube around the bundle, and c) drawing optical fiber from a heated end of the preform; wherein the method further comprises sealing, prior to said drawing step, a first end of the capillary tubes, without sealing said interstitial spaces, said first end being the end that is remote from the heated end of the preform; and the drawing step is carried out such that a gas pressure in the capillary tubes with sealed first end is self-regulating.

19. Method according to claim 18, wherein the first ends of the capillary tubes are sealed before arranging the core element and the capillary tubes into a bundle.

20. Method according to claim 18, wherein the first ends of the capillary tubes are sealed after arranging the core element and the capillary tubes into a bundle.

* * * * *